United States Patent
Olgaard et al.

(10) Patent No.: US 11,838,776 B2
(45) Date of Patent: Dec. 5, 2023

(54) SYSTEM AND METHOD FOR TESTING A DATA PACKET SIGNAL TRANSCEIVER

(71) Applicant: LitePoint Corporation, San Jose, CA (US)

(72) Inventors: Christian Volf Olgaard, Saratoga, CA (US); Ruizu Wang, Santa Clara, CA (US); Chen Cao, Sunnyvale, CA (US)

(73) Assignee: Litepoint Corporation, San Jose, CA (US)

( * ) Notice: Subject to any disclaimer, the term of this patent is extended or adjusted under 35 U.S.C. 154(b) by 0 days.

(21) Appl. No.: 17/078,625

(22) Filed: Oct. 23, 2020

(65) Prior Publication Data

US 2022/0132340 A1      Apr. 28, 2022

(51) Int. Cl.
*H04W 24/08* (2009.01)

(52) U.S. Cl.
CPC .................................. *H04W 24/08* (2013.01)

(58) Field of Classification Search
None
See application file for complete search history.

(56) References Cited

U.S. PATENT DOCUMENTS

| | | | | |
|---|---|---|---|---|
| 10,666,542 | B1 | 5/2020 | Olgaard et al. | H04L 43/50 |
| 10,819,616 | B2 | 10/2020 | Olgaard et al. | H04L 43/50 |
| 2004/0076138 | A1* | 4/2004 | Serceki | H04L 1/20 |
| | | | | 370/328 |
| 2006/0193300 | A1* | 8/2006 | Rawat | H04W 12/126 |
| | | | | 370/338 |
| 2009/0209250 | A1 | 8/2009 | Huq | H04B 17/000 |
| 2013/0326274 | A1* | 12/2013 | Olgaard | G06F 11/2733 |
| | | | | 714/E11.177 |
| 2018/0003764 | A1 | 1/2018 | Menon et al. | G01R 31/028 |
| 2018/0124694 | A1* | 5/2018 | Pefkianakis | H04W 72/541 |
| 2020/0008085 | A1 | 1/2020 | Kaushik et al. | H04W 24/008 |
| 2020/0112896 | A1* | 4/2020 | Kondareddy | H04W 72/542 |
| 2020/0228434 | A1 | 7/2020 | Olgaard et al. | H04L 12/026 |

OTHER PUBLICATIONS

International Search Report issued in corresponding foreign application, PCT/US2021/055789, pp. 1-5 (dated Feb. 16, 2022).
Written Opinion of the International Searching Authority issued in correpsonding foreign application, PCT/US2021/055789, pp. 1-5 (dated Feb. 16, 2022).
International Preliminary Report on Patentability in Application No. PCT/US2021/055789 dated Apr. 13, 2023 (6 pages).

* cited by examiner

*Primary Examiner* — Saad Khawar
(74) *Attorney, Agent, or Firm* — Burns & Levinson LLP

(57) ABSTRACT

A system and method for using a wireless radio frequency (RF) data packet signaling link to enable non-link control of testing of a data packet signal transceiver device under test (DUT) in which a communication session between a tester and a DUT for purposes of testing the DUT may first be initiated by a separate, commonly available, and lower cost, communication device. Following its establishment, the tester may monitor the communication session, e.g., via wireless signal sniffing, to acquire and use associated device identification information to join the session and transmit trigger based test (TBT) data packets for initiating a test sequence within the DUT. Hence, use of a non-link capable tester to perform parametric testing of a DUT at the lowest network architecture layer, e.g., the physical (PHY) layer, may be enabled.

23 Claims, 2 Drawing Sheets

SYSTEM AND METHOD FOR TESTING A DATA PACKET SIGNAL TRANSCEIVER

BACKGROUND

The present invention relates to systems and methods for testing a data packet signal transceiver device under test (DUT), and in particular, to systems and methods for using wireless radio frequency (RF) non-link data packet signaling to test a DUT.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include, at least, one or more sources of test signals (e.g., in the form of a vector signal generator, or "VSG") for providing the source signals to be transmitted to the DUT, and one or more receivers (e.g., in the form of a vector signal analyzer, or "VSA") for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

In cases of testing wireless devices for mobile voice and messaging signal communications, such as cellular handset devices, it may be advantageous to perform final manufacturing tests in an over-the-air (OTA) testing environment. For example, in cellular End of Line (EoL) testing, the DUT is often controlled by sending commands to it through a Wi-Fi link so as to emulate a cabled signal connection (unavailable during OTA testing) similar to that used earlier in the manufacturing and assembly process (e.g., at board test). For this to work, a real operating signal link between the DUT and an access point (AP) such as a Wi-Fi router is required. However, conventional cellular testing of the cellular radio technology of the DUT requires the tester signal transmission hardware to be capable of link-based signaling, which is significantly more costly than non-link-based signal transmission hardware. Accordingly, it would be desirable to enable full EoL testing without a need for link-based tester signal transmission hardware.

SUMMARY

A system and method are provided for using a wireless radio frequency (RF) data packet signaling link to enable non-link control of testing of a data packet signal transceiver device under test (DUT) in which a communication session between a tester and a DUT for purposes of testing the DUT may first be initiated by a separate, commonly available, and lower cost, communication device. Following its establishment, the tester may monitor the communication session, e.g., via wireless signal sniffing, to acquire and use associated device identification information to join the session and transmit trigger based test (TBT) data packets for initiating a test sequence within the DUT. Hence, use of a non-link capable tester to perform parametric testing of a DUT at the lowest network architecture layer, e.g., the physical (PHY) layer, may be enabled.

In accordance with exemplary embodiments, a system for using a radio frequency (RF) data packet signaling link to enable non-link control of testing of a data packet signal transceiver device under test (DUT) includes: a first RF data packet signal transceiver, a tester having a second RF data packet signal transceiver, and a controller coupled to the first RF data packet signal transceiver and the tester, to initiate a plurality of communicative interactions between the DUT and the first RF data packet signal transceiver and tester. The controller includes memory capable of storing executable instructions, and one or more processors operably coupled to the memory and responsive to the executable instructions by: causing the first RF data packet signal transceiver to transmit, during one of the plurality of communicative interactions, a first RF data packet signal for reception by a DUT to establish a communication session, and causing the tester to transmit, during a subsequent one of the plurality of communicative interactions, a second RF data packet signal for reception by the DUT to maintain the communication session, wherein the second RF data packet signal includes one or more trigger based test (TBT) data packets.

In accordance with further exemplary embodiments, a method for using a radio frequency (RF) data packet signaling link to enable non-link control of testing of a data packet signal transceiver device under test (DUT) includes: initiating a plurality of communicative interactions between a DUT and a RF data packet signal transceiver and a tester; transmitting, with the RF data packet signal transceiver during one of the plurality of communicative interactions, a first RF data packet signal for reception by a DUT to establish a control communication session; detecting, with the tester, the communication session; and transmitting, with the tester during a subsequent one of the plurality of communicative interactions, a second RF data packet signal for reception by the DUT via the communication session, wherein the second RF data packet signal includes one or more trigger based test (TBT) data packets.

DETAILED DESCRIPTION

Figure 1:
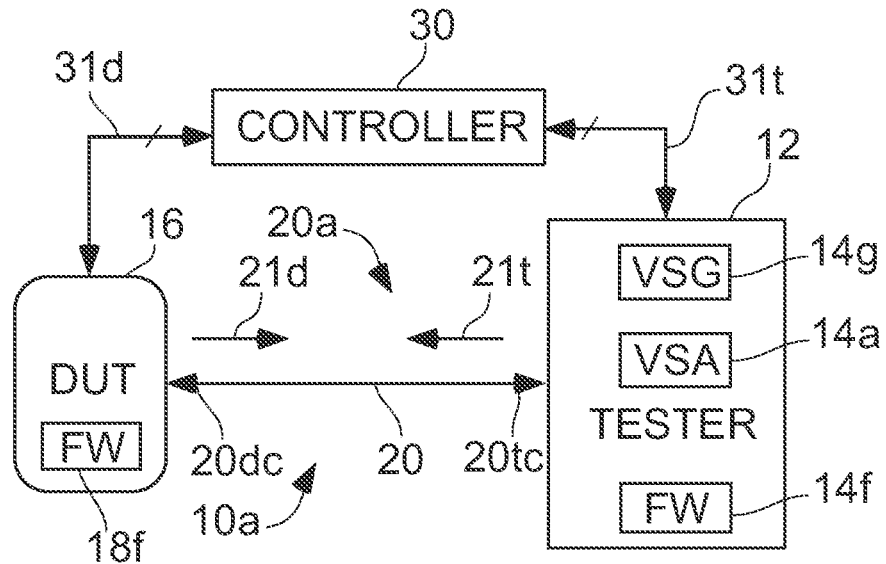
FIG. 1 depicts a wired, or conductive, test environment for testing a data packet signal transceiver device in accordance with exemplary embodiments.

The following detailed description is of example embodiments of the presently claimed invention with references to the accompanying drawings. Such description is intended to be illustrative and not limiting with respect to the scope of the present invention. Such embodiments are described in enough detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

The acts, modules, logic and method steps discussed herein, in accordance with example embodiments, may take the form of a computer program or software code stored in a tangible machine-readable medium (or memory) in communication with a control unit, comprising a processor and memory, which executes the code to perform the described behavior, function, features and methods. It will be recognized by one of ordinary skill in the art that these operations, structural devices, acts, logic, method steps and modules may be implemented in software, in firmware, in special purpose digital logic, and any combination thereof without deviating from the spirit and scope of the present invention as recited within the claims attached hereto.

Wireless devices, such as cellphones, smartphones, tablets, etc., make use of standards-based technologies, such as IEEE 802.11a/b/g/n/ac/ax ("WiFi"), 3GPP LTE, Bluetooth, Zigbee, Z-Wave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and one or more transmitters. Thus, the tests are intended to confirm whether the receivers and transmitters both conform. Tests of the receiver(s) of the DUT (RX tests) typically involve a test system (tester) sending test packets to the receiver(s) and some way of determining how the DUT receiver(s) respond to those test packets. Tests of the transmitter(s) of the DUT (TX tests) are performed by having them send packets to the test system, which may then evaluate various physical characteristics of the signals from the DUT.

Testing of wireless devices, such as Wi-Fi, Bluetooth, Zigbee and Z-Wave devices, has progressed from frequent two-way messaging between a tester and DUT to infrequent messaging between which major portions of test flows are executed within and coordinated between tester and DUT using non-link test solutions where only the unique device identifier and portions of the PHY are active. However, results of such tests would typically have been conveyed from DUT to tester via communications ports and pathways as the upper level of the protocol stack is not active, thereby preventing data from being easily conveyed in the transmitted packets. Therefore, where the only connection between a DUT and tester is either conducted or radiated signal paths and the data exchanged is via data packets, it may be difficult, if possible at all, for a DUT to convey test results to a tester using non-link test methods. As discussed in more detail below, in accordance with exemplary embodiments of the presently claimed invention, testing of a RF data packet transceiver can be performed, at least in part, by testing at lower layers of the network data packet signal communications protocol.

Referring to FIG. 1, a typical testing environment 10*a* includes a tester 12 and a DUT 16, with test data packet signals 21*t* and DUT data packet signals 21*d* exchanged as RF signals conveyed between the tester 12 and DUT 16 via a conductive signal path 20*a*, typically in the form of co-axial RF cable 20*c* and RF signal connectors 20*tc*, 20*dc*. As noted above, the tester typically includes a signal source 14*g* (e.g., a VSG) and a signal analyzer 14*a* (e.g., a VSA). The tester 12 and DUT 16 may also include preloaded information regarding predetermined test sequences, typically embodied in firmware 14*f* within the tester 12 and firmware 18*f* within the DUT 16. The testing details within this firmware 14*f,* 18*f* about the predetermined test flows typically require some form of explicit synchronization between the tester 12 and DUT 16, typically via the data packet signals 21*t*, 21*d*.

Alternatively, testing may be controlled by a controller 30 which may be integral to the tester 12 or external (e.g., a local or networked programmed personal computer) as depicted here. The controller 30 may communicate with the DUT 16 via one or more signal paths (e.g., Ethernet cabling, network switches and/or routers, etc.) 31*d* to convey commands and data. If external to the tester 12, the controller 30 may further communicate with the tester 12 via one or more additional signal paths (e.g., Ethernet cabling, network switches and/or routers, etc.) 31*t* to convey additional commands and data.

While the controller 30 and tester 12 are depicted as separate devices or systems, references to a "tester" in the following discussion may include separate devices or systems as depicted here and may also include a combined device or system in which the functions and capabilities of the controller 30 and tester 12 described above may be co-located in a common hardware infrastructure. Accordingly, unless otherwise specifically required or limited, references made to various control functions and/or commands may be considered to originate in a tester 12, a controller 30 or a combined tester/controller system (not shown). Similarly, storage of commands, data, etc., may be considered to be done in a tester 12, a controller 30 or a combined tester/controller system, or alternatively in memory devices located remotely via a network as noted above.

Figure 2:
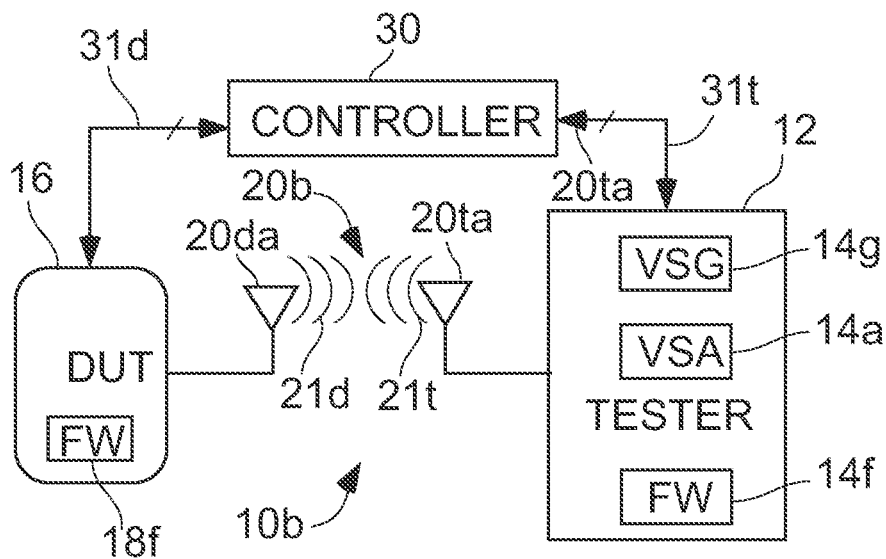
FIG. 2 depicts a wireless, or radiative, test environment for testing a data packet signal transceiver device in accordance with exemplary embodiments.

Referring to FIG. 2, an alternative testing environment 10b uses a wireless signal path 20b via which the test data packet signals 21t and DUT data packet signals 21d may be communicated via respective antenna systems 20ta, 20da of the tester 12 and DUT 16.

As discussed in more detail below, a trigger based test (TBT) may be advantageously used in which a tester sends a data packet containing a trigger frame to the DUT, thereby causing the DUT to timely reply with a frequency corrected signal. As is well known in the art, in conformance with the IEEE 802.11 set of specifications, a trigger frame may be provided by an access point (AP, e.g., a tester in a test environment) for a STA device (e.g., a DUT in the test environment) and include various types of information about the transmitted signal from the tester emulating an AP access point. For example, the actual signal power transmitted by the tester (e.g., via its VSG) may be controlled separately from the reported tester power level information contained in the trigger frame, and thereby emulate a path loss does not exist. Also, desired RSSI information may be contained in the trigger frame identifying the strength of the data packet signal to be sent in reply by the DUT. The DUT may calculate a path loss as the difference in power between the reported transmitted power by the tester and the DUT received signal strength, and then calculate a transmit power as the desired RSSI (at the tester) plus the calculated path loss.

Method examples described herein may be implemented, at least in part, with nor or more machines or computing devices. Some examples may include a computer-readable medium or machine-readable medium encoded with instructions operable to configure an electronic device to perform methods as described in the examples disclosed herein. An example implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, without limitation, hard disks, removable magnetic disks, removable optical disks (e.g., compact disks and digital video disks), magnetic cassettes, memory cards or sticks, random access memory (RAM), read only memory (ROM), and the like.

Figure 3:
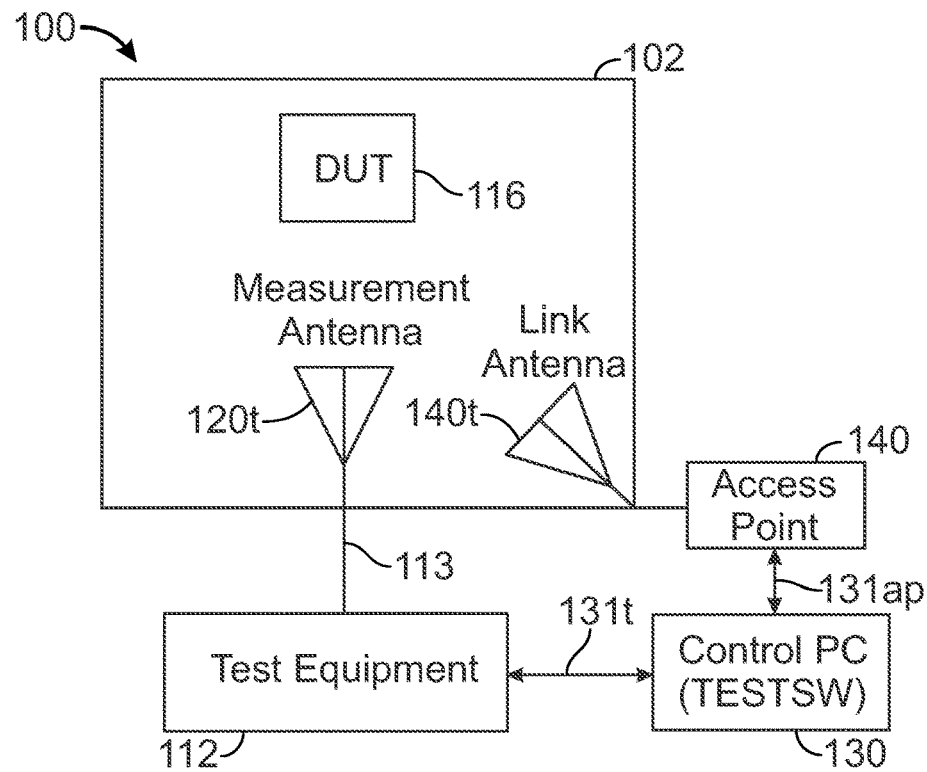
FIG. 3 depicts a testing environment including a system and enabling a method for testing a data packet signal transceiver in accordance with example embodiments.

Referring to FIG. 3, a testing environment 100 (e.g., a modified form of that depicted in FIG. 2) including a system and enabling a method for testing a data packet signal transceiver in accordance with example embodiments may include hardware elements as shown. For example, an electromagnetically shielded OTA testing enclosure 102 may be employed to enclose the DUT 116 to isolate, insulate or otherwise shield it from undesired electromagnetic signals. Also enclosed may be a measurement antenna 120t and a link antenna 140t for conveying wireless RF signals between the DUT 116 and a tester 112 and a wireless access point (AP) 140, respectively.

Operations and interactions among the controller 130 (e.g., a personal computer (PC) or other autonomous or networked computing device), tester 112 and DUT 116 may occur as described above in reference to FIGS. 1 and 2, with the measurement antenna 120t serving as the tester antenna system 20ta. As discussed in more detail below, the AP 140 initiates communications between it and the DUT 116 (e.g., interactions in which the AP 140 and DUT 116 exchange data packets containing commands and responsive data, respectively) for subsequent assumption and use by the tester 112. As an economic advantage of such a testing environment 100, the AP 140 may be a Wi-Fi router or other wireless data packet communications device serving to establish communications with the DUT 116 in which data packets are conveyed containing non-link data (such as those that operate at the lowest layer, e.g., the Physical PHY Layer, of the Open Systems Interconnection (OSI) model (e.g., Physical, Network, Transport, Session, Presentation and Application layers) that characterizes and standardizes communication functions of a telecommunication or computing system). In accordance with well known principles, the PHY layer may be used as a standard transport layer (e.g., appearing to function as a serial port conveying RS-232 commands) that enables the DUT to receive commands and internally force responsive operations.

For example, in accordance with predetermined testing operations, the DUT 116 may enter a test mode and the controller 130 sets up a communication session between the AP 140 and the DUT 116 to enable issuance by the controller 130 of cellular DUT control commands to the DUT 116 via non-link Wi-Fi signals. Meanwhile or subsequently, the controller 130 may program a test sequence into the tester 112 for execution of respective operations by and communications between the tester 112 and DUT 116 via the measurement antenna 120t. During or after retrieval of the test results (e.g., by the controller 130), further test operations may be executed and/or repeated for the same and/or additional test sequences. In an alternative configuration a single antenna device or system (not shown) may be used and shared by the tester 112 and AP 140, e.g., with RF switching circuitry (not shown) connecting such single antenna device or system to the tester 112 and AP 140 for enabling use as desired.

Following testing of cellular operation(s), Wi-Fi and Bluetooth operations may be tested in similar manners. Conventional techniques have used the cellular communication session, or link, to control Wife and/or Bluetooth operations. However, this requires use of a high cost cellular tester or base station. Further, the initial non-link communication session established by the AP 140 between it and the DUT 116 blocks the ability to operate the Wi-Fi portion of the DUT 116 in a special, or user, mode since the DUT 116 would need to switch between user and test modes of operation. Instead, in accordance with example embodiments, the initial non-link communication session established by the AP 140 between it and the DUT 116 is assumed and then used by the tester 112 to advantageously use capabilities of Wi-Fi signals conforming to the IEEE 802.11ax standard, which enable control of responses from a client DUT using control bits in the packet sent to the DUT, e.g., in the form of trigger based test (TBT) data packets.

Alternatively, tests may be performed in other orders as desired. For example, testing of cellular operation(s) may be preceded by testing of other operations (e.g., Wi-Fi and/or Bluetooth operations), or various tests may be performed in part or in full in any order in a mixed fashion as desired or deemed advantageous in accordance with the performance parameters of concern.

In contrast to convention techniques in which a distinct test mode is used to enable DUT testing to be performed, in accordance with example embodiments, e.g., as described above, the tester 112 may monitor (e.g., via data packet "sniffing") communications between the DUT 116 and the AP 140, and prepare transmission data packets to command or otherwise initiate action(s) within the DUT 116 such that the DUT 116 replies to TBT data packets sent by the tester 112. In accordance with well known principles and techniques, TBT data packets may be used to control how a DUT replies. For example, as noted above, appropriate TBT data packets may be sent to the DUT in such a testing environment to cause it to reply with responsive data packets containing data indicative of its RSSI and TX power. This effectively enables testing of Wi-Fi operations of the DUT contemporaneously. (As noted above, that an RF switch may be included prevent the AP 140 from interacting with the DUT 116 during test.)

Figure 4:
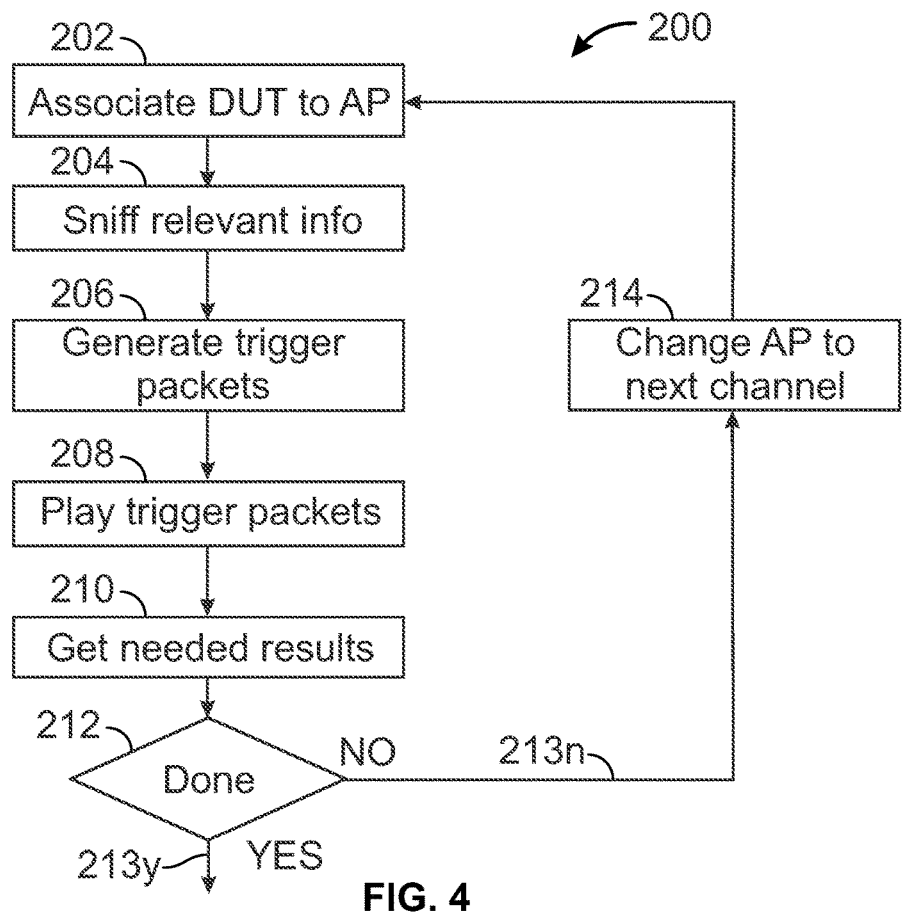
FIG. 4 depicts a process flow for a method for testing a data packet signal transceiver in accordance with example embodiments.

Referring to FIG. 4, a process flow 200 for a method for testing a data packet signal transceiver in accordance with example embodiments may include steps as shown. For example, as discussed above, such process 200 may begin with the AP 140 associating itself 202 with the DUT 116, e.g., by initiating, or otherwise establishing a non-link communication session with the DUT 116. Meanwhile, the tester 112 may monitor such communication session 204, e.g., by sniffing data packets exchanged during such communication session. Such monitored (or sniffed) data packets may include identification information about the AP 140, e.g., a media access control (MAC) address associated with or otherwise related to the DUT 116. The tester 112 may then use information so obtained (including identification information about the AP 140) as it proceeds to produce TBT data packets 206 and transmit such TBT data packets 208 for reception by the DUT 116 via the communication session originally initiated by the AP 140. In response, as further discussed above, the DUT 116 may reply with responsive test data packets for reception 210 by the tester 112. Status of the desired testing may then be evaluated for completion 212. If complete 213y, the flow may then terminate or proceed to further operations. If not complete 213n, the AP 140 may be re-engaged to initiate communications with the DUT 116 via a different Wi-Fi channel 214, after which the preceding operations may be repeated via such different channel.

Additional discussion of uses of TBT data packets may be found in U.S. patent application Ser. No. 16/248,453 and U.S. Pat. No. 10,666,542, both of which were filed on Jan. 15, 2019, and are entitled "System and Method for Testing a Data Packet Signal Transceiver". The contents of both of these documents are incorporated herein by reference.

Hence, in accordance with the foregoing discussion, intercepting a link may enable use of a non-link test methodology to test Wi-Fi performance of a DUT. While such link interception may be more advantageously used for testing Wi-Fi performance, it nonetheless may also be used to enable Wi-Fi access for controlling testing of cellular devices (e.g., cellular telephones).

As will be readily appreciated by those having skill in this art, systems and methods in accordance with the foregoing discussion may further be advantageous for testing Internet-of-things (IoT) devices (e.g., IoT 802.11ax devices), which generally do not allow control interfaces to be exposed after the device has been encased or otherwise enclosed in its packaging. Hence, such devices will generally have no externally available conductive signal connections and are, therefore, limited to radiative signal communications.

Various other modifications and alternatives in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system for testing a device under test (DUT), the system comprising:
 a first RF (Radio Frequency) data packet signal transceiver;
 a tester comprising a second RF data packet signal transceiver; and
 a controller, in communication with the first RF data packet signal transceiver and the tester, to control the first RF data packet signal transceiver and the tester, the controller comprising:
 memory storing instructions that are executable, and
 one or more processors to execute the instructions to perform operations comprising:
 causing the first RF data packet signal transceiver to transmit, a first RF data packet signal for reception by the DUT using non-link signaling, where the non-link signaling occurs exclusively at a physical layer of a network;
 causing the tester to monitor the non-link signaling performed by the first RF data packet signal transceiver; and
 causing the tester to transmit a second RF data packet signal for testing of the DUT using non-link signaling, wherein the second RF data packet signal comprises one or more trigger based test (TBT) data packets, where a TBT data packet contains information that causes the DUT to reply with specific content, and wherein the non-link signaling performed by the tester is based on information obtained by monitoring the non-link signaling performed by the first RF data packet signal transceiver.

2. The system of claim 1, wherein the first RF data packet signal transceiver comprises a Wi-Fi signal transceiver.

3. The system of claim 1, wherein the operations comprise causing the first RF data packet signal transceiver to terminate transmission of the first RF data packet signal.

4. The system of claim 1, wherein the information obtained comprises identification information about the first RF data packet signal transceiver.

5. The system of claim 4, wherein the operations comprise:
 causing the tester to transmit the second RF data packet signal with the identification information.

6. The system of claim 1, wherein causing the tester to transmit the second RF data packet signal comprises causing the tester to transmit the second RF data packet signal with identification information corresponding to the first RF data packet signal transceiver.

7. The system of claim 1, wherein the specific content comprises at least one of a DUT transmission power or a DUT received signal strength indicator (RSSI).

8. The system of claim 1, wherein the operations comprise:
causing the tester to determine whether the reply from the DUT with the specific content has been completed; and
upon determining the reply from the DUT with the specific content has not been completed, causing the tester to select a channel to send the second RF data packet signal including the one or more TBT data packets to the DUT.

9. A method of testing of a device under test (DUT), the method comprising:
transmitting, using a first RF (Radio Frequency) data packet signal transceiver, a first RF data packet signal for reception by the DUT using non-link signaling, where non-link signaling occurs exclusively at a physical layer of a network;
monitoring, using a tester, the non-link signaling performed by the first RF data packet signal transceiver; and
transmitting, using the tester, a second RF data packet signal for testing of the DUT using non-link signaling, wherein the second RF data packet signal comprises one or more trigger based test (TBT) data packets, where a TBT data packet contains information that causes the DUT to reply with specific content, and wherein the non-link signaling performed by the tester is based on information obtained by monitoring the non-link signaling performed by the first RF data packet signal transceiver.

10. The method of claim 9, wherein the first RF data packet signal transceiver comprises a Wi-Fi signal transceiver.

11. The method of claim 9, further comprising terminating transmission of the first RF data packet signal.

12. The method of claim 9, wherein monitoring comprises capturing identification information about the first RF data packet signal transceiver.

13. The method of claim 12, wherein ing:
transmitting, using the tester, the second RF data packet signal comprises transmitting the second RF data packet signal with the identification information.

14. The method of claim 9, wherein transmitting the second RF data packet signal comprises transmitting the second RF data packet signal with identification information corresponding to the first RF data packet signal transceiver to maintain a communication session initiated by the first RF data packet signal transceiver.

15. The method of claim 9, wherein the specific content comprises at least one of a DUT transmission power or a DUT received signal strength indicator (RSSI).

16. The method of claim 9, further comprising:
causing the tester to determine whether the reply from the DUT with the specific content has been completed; and
upon determining the reply from the DUT with the specific content has not been completed, causing the tester to select a channel to send the second RF data packet signal including the one or more TBT data packets to the DUT.

17. One or more non-transitory machine-readable storage devices storing instructions that are executable by one or more processing devices to perform operations to test a device under test (DUT), the operations comprising:
controlling a first RF (Radio Frequency) data packet signal transceiver to transmit a first RF data packet signal for reception by the DUI using non-link signaling, where the non-link signaling occurs exclusively at a physical layer of a network;
controlling the tester to monitor the non-link signaling performed by the first RF data packet signal transceiver; and
controlling the tester to transmit a second RF data packet signal for testing of the DU T using non-link signaling, wherein the second RF data packet signal comprises one or more trigger based test (TBT) data packets, where a TBT data packet contains information that causes the DUI to reply with specific content, and wherein the non-link signaling performed by the tester is based on information obtained by monitoring the non-link signaling performed by the first RF data packet signal transceiver.

18. The one or more non-transitory machine-readable storage devices of claim 17, wherein the first RE data packet signal transceiver comprises a Wi-Fi signal transceiver.

19. The one or more non-transitory machine-readable storage devices of claim 17, wherein the operations comprise controlling the first RF data packet signal transceiver to terminate transmission of the first RF data packet signal.

20. The one or more non-transitory machine-readable storage devices of claim 17, wherein monitoring comprises capturing identification information about the first data packet signal transceiver.

21. The one or more non-transitory machine-readable storage devices of claim 20, wherein the operations comprise:
controlling the tester to transmit the second RF data packet signal using the identification information.

22. The one or more non-transitory machine-readable storage devices of claim 17, wherein the specific content comprises at least one of a DUI transmission power or a DUT received signal strength indicator (RSSI).

23. The one or more non-transitory machine-readable storage devices of claim 17, wherein the operations comprise:
causing the tester to determine whether the reply from the DUT with the specific content has been completed; and
upon determining the reply from the DUT with the specific content has not been completed, causing the tester to select a channel to send the second RF data packet signal including the one or more TBT data packets to the DUT.

* * * * *